(12) United States Patent
Heine

(10) Patent No.: US 12,268,131 B2
(45) Date of Patent: Apr. 8, 2025

(54) CUTTING DEVICE

(71) Applicant: Fiskars Finland Oy Ab, Espoo (FI)

(72) Inventor: Mikko Heine, Espoo (FI)

(73) Assignee: Fiskars Finland Oy Ab, Espoo (FI)

( * ) Notice: Subject to any disclaimer, the term of this patent is extended or adjusted under 35 U.S.C. 154(b) by 263 days.

(21) Appl. No.: 17/680,707

(22) Filed: Feb. 25, 2022

(65) Prior Publication Data

US 2022/0304242 A1    Sep. 29, 2022

(30) Foreign Application Priority Data

Mar. 23, 2021 (FI) .................................. 20215327

(51) Int. Cl.
*A01G 3/025* (2006.01)
*A01G 3/02* (2006.01)

(52) U.S. Cl.
CPC ........... *A01G 3/0251* (2013.01); *A01G 3/021* (2013.01)

(58) Field of Classification Search
CPC .......... A01G 3/02; A01G 3/021; A01G 3/025; A01G 3/0251; B26B 13/00; B26B 13/28; B26B 17/00; B26B 17/006; B23D 29/02; B23D 29/023
USPC ......................................................... 30/251
See application file for complete search history.

(56) References Cited

U.S. PATENT DOCUMENTS

| | | | | |
|---|---|---|---|---|
| 1,137,380 A | * | 4/1915 | Buell | A01G 3/025 30/250 |
| 1,716,180 A | * | 6/1929 | Marler | A01G 3/0251 30/186 |
| 2,090,228 A | * | 8/1937 | Porter et al. | A01G 3/0251 30/252 |

(Continued)

FOREIGN PATENT DOCUMENTS

| CN | 101653949 A | 2/2010 |
|---|---|---|
| CN | 105916369 A | 8/2016 |

(Continued)

OTHER PUBLICATIONS

Search Report for Finnish Application No. 20215327, dated Oct. 21, 2021, 1 page.

(Continued)

*Primary Examiner* — Jason Daniel Prone
(74) *Attorney, Agent, or Firm* — FOLEY & LARDNER LLP

(57) ABSTRACT

A cutting device includes a jaw with a first jaw member and a second jaw member, a first handle attached to the first jaw member and a second handle rotatably connected to the second jaw member at a second pivot point, a gear including a first set of teeth and a second set of teeth at a first end of the second handle. The second handle is slidably connected to the second jaw member at the second pivot point to allow the second handle and the second set of teeth to move into a disengaged position where the second set of teeth are located at a distance from the first set of teeth. To ensure that the teeth of the gear engage correctly, a slide lock is in an (Continued)

enabling state allowing the second handle and the second set of teeth to slide in a slide direction from the disengaged position to the engaged position only when the first set of teeth and the second set of teeth are aligned into a mutually predetermined position.

7 Claims, 2 Drawing Sheets

(56) References Cited

U.S. PATENT DOCUMENTS

| | | | | | |
|---|---|---|---|---|---|
| 2,508,790 | A | * | 5/1950 | Herr | A01G 3/02 30/239 |
| 2,520,905 | A | * | 9/1950 | Borrelli | A01G 3/02 30/237 |
| 5,511,314 | A | * | 4/1996 | Huang | A01G 3/0251 30/249 |
| 5,570,510 | A | * | 11/1996 | Linden | B26B 13/28 30/250 |
| 5,689,888 | A | * | 11/1997 | Linden | A01G 3/0251 30/250 |
| 5,761,815 | A | * | 6/1998 | Lin | A01G 3/0251 30/251 |
| 5,839,195 | A | * | 11/1998 | Lin | A01G 3/0251 30/250 |
| 6,345,446 | B1 | * | 2/2002 | Huang | A01G 3/0251 30/250 |
| 6,964,099 | B1 | * | 11/2005 | Zeng | A01G 3/02 30/254 |
| 7,530,172 | B1 | * | 5/2009 | Wu | A01G 3/0251 30/244 |
| 8,166,659 | B2 | * | 5/2012 | Huang | A01G 3/021 30/251 |
| 8,225,513 | B2 | * | 7/2012 | Huang | A01G 3/0251 30/251 |
| 8,327,549 | B2 | * | 12/2012 | Huang | A01G 3/0251 30/251 |
| 8,726,523 | B2 | * | 5/2014 | Wang | B26B 13/28 30/252 |
| 9,345,200 | B2 | * | 5/2016 | Cunningham | A01G 3/0251 |
| 9,408,350 | B1 | * | 8/2016 | Wu | A01G 3/021 |
| 9,426,945 | B2 | * | 8/2016 | Hsu | A01G 3/021 |
| 9,554,522 | B2 | * | 1/2017 | Reh | A01G 3/0251 |
| 9,622,422 | B2 | * | 4/2017 | Hsu | A01G 3/021 |
| 9,736,990 | B2 | * | 8/2017 | Lin | A01G 3/0251 |
| 10,212,891 | B1 | * | 2/2019 | Wu | A01G 3/0251 |
| 11,324,169 | B2 | * | 5/2022 | Huang | A01G 3/025 |
| 2003/0110642 | A1 | | 6/2003 | Still | |
| 2003/0140501 | A1 | | 7/2003 | Linden et al. | |
| 2006/0026845 | A1 | * | 2/2006 | Lin | A01G 3/0251 30/249 |
| 2006/0156554 | A1 | * | 7/2006 | Lin | A01G 3/0251 30/249 |
| 2010/0162575 | A1 | * | 7/2010 | Lin | A01G 3/0251 30/245 |
| 2010/0269357 | A1 | * | 10/2010 | Shan | A01G 3/0251 30/254 |
| 2011/0154668 | A1 | * | 6/2011 | Liu | A01G 3/0251 30/252 |
| 2014/0053413 | A1 | * | 2/2014 | Huang | A01G 3/0251 30/252 |
| 2016/0120132 | A1 | * | 5/2016 | Hsu | A01G 3/021 30/251 |
| 2016/0345506 | A1 | * | 12/2016 | Lin | A01G 3/021 |
| 2017/0332558 | A1 | | 11/2017 | Dechant et al. | |
| 2022/0312682 | A1 | * | 10/2022 | Chan | A01G 3/021 |
| 2022/0346326 | A1 | * | 11/2022 | Chan | A01G 3/021 |

FOREIGN PATENT DOCUMENTS

| | | | |
|---|---|---|---|
| CN | 111373616 A | | 7/2020 |
| CN | 112335435 A | | 2/2021 |
| DE | 10 2004 039 624 A1 | | 2/2006 |
| DE | 20 2018 101 754 U1 | | 4/2018 |
| EP | 1625784 A1 | * | 2/2006 ........... A01G 3/0251 |
| GB | 2578933 A | * | 6/2020 ........... A01G 3/0251 |
| WO | WO-2006072309 A1 | * | 7/2006 ........... A01G 3/0251 |

OTHER PUBLICATIONS

Extended European Search Report for EP Application No. 22163028.8, dated Aug. 22, 2022, 9 pages.

First Office Action for CN Application No. 202210209933.6, dated Aug. 15, 2023, 14 pages.

* cited by examiner

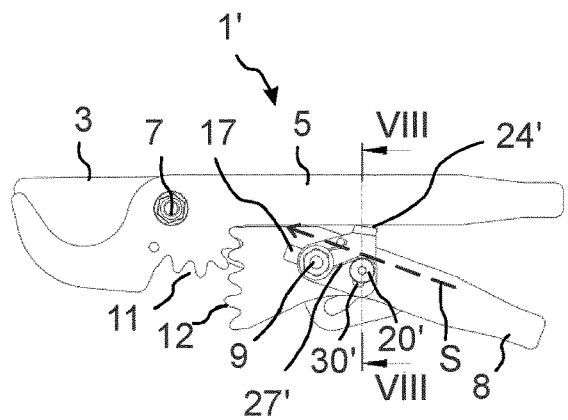
FIG. 6
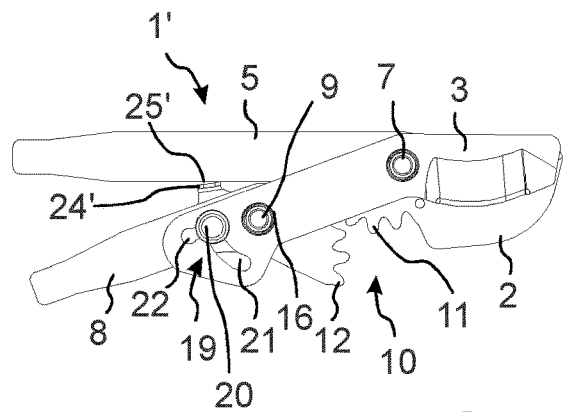
FIG. 7
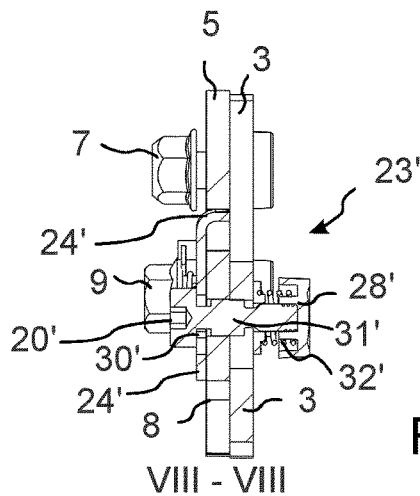
FIG. 8
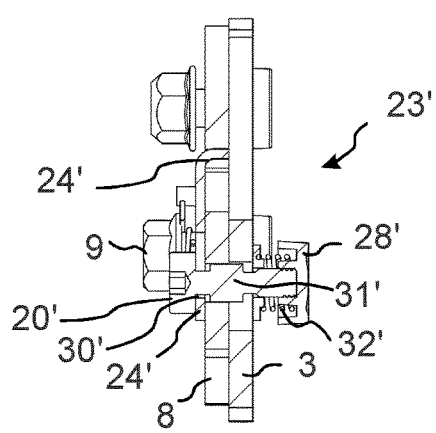
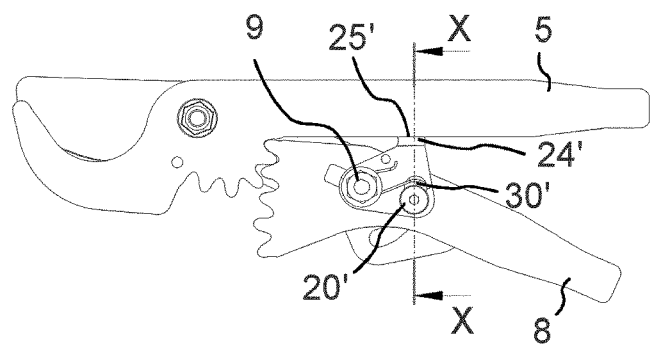
FIG. 9
FIG. 10

CUTTING DEVICE

CROSS-REFERENCE TO RELATED PATENT APPLICATIONS

This application claims the benefit of priority to Finland patent application number 20215327, filed on Mar. 23, 2021, the complete disclosure of which is hereby incorporated by reference for all purposes.

FIELD

This invention relates to cutting device and more particularly to a solution for improving the user friendliness of a cutting device. In the following the invention will by way of example be explained by referring to a garden tool, such as a lopper for cutting branches, for instance. However, it should be observed that the invention can be utilized also for other types of cutting devices.

BACKGROUND

Previously there is known a cutting device, such as a lopper, with a first and a second jaw member which are rotatably connected to each other. The first jaw member is attached to a handle. In order to facilitate that this cutting tool can be used to cut objects requiring use of a significant cutting force, the cutting tool is provided with a gear set. This gear set includes a first set of teeth in the first jaw member and a second set of teeth in a first end of a second handle. In this way, due to the gear, a significant cutting force can be obtained.

Due to the gear set, a large amount of handle movement is required also during a cutting stroke where small objects requiring a small cutting force are cut. Therefore, in the known cutting device the second handle is slidably connected to the second jaw member. In that way the second handle with the second set of teeth may be slidably moved into a disengaged position where the second set of teeth is located at a distance from the first set of teeth. In the disengaged position, the cutting device may be used without the gear set, due to which cutting of small objects can be achieved without a large amount of handle movement.

A problem involved with this known device, is that once the second handle with the second set of teeth slides back to the engaged position, the teeth in the first and second set of teeth may engage each other in an incorrect position. Due to this the cutting device may be jammed or in worst case brake, if the handles are pressed with a large force at this stage.

SUMMARY

An object of the present invention is to solve the above-mentioned drawback and to provide a cutting device which is more user friendly, as it ensures that the teeth engage each other correctly. This object is achieved with the cutting device according to independent claim 1.

A slide lock which is in an enabling state allows the second handle and the second set of teeth to slide in a slide direction from the disengaged position to the engaged position only when the first set of teeth and the second set of teeth are aligned into a mutually predetermined position, efficiently prevents incorrect engagement of the teeth.

Preferred embodiments of the invention are disclosed in the dependent claims.

BRIEF DESCRIPTION OF THE DRAWINGS

In the following the present invention will be described in closer detail by way of example and with reference to the attached drawings, in which FIGS. 6 to 10 illustrate a second embodiment of a cutting device.

DETAILED DESCRIPTION

Figure 1:
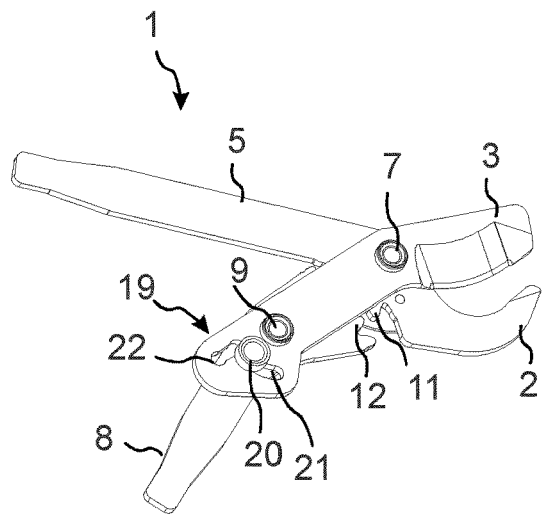
FIGS. 1 to 5 illustrate a first embodiment of a cutting device.
Figure 2:
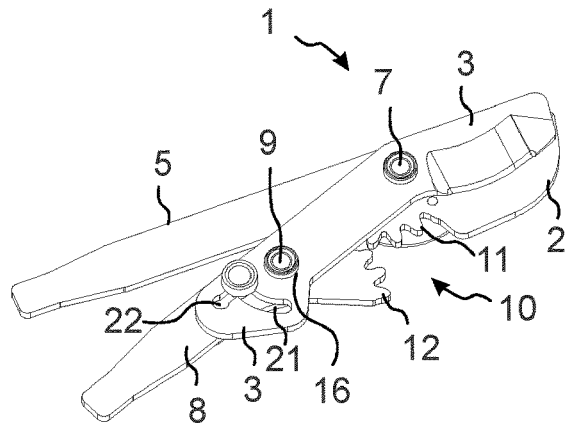
Figure 3:
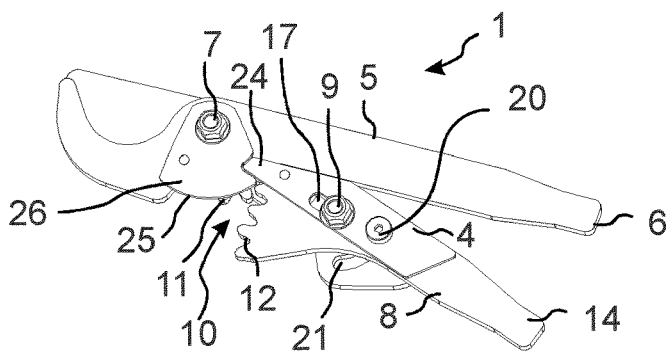

FIGS. 1 to 5 illustrate a first embodiment of a cutting device 1. FIGS. 1 to 3 illustrate the cutting device 1 in the engaged position and FIGS. 4 to 5 in the disengaged position. In the figures it is by way of example assumed that the cutting device is a garden tool, such as a lopper for cutting branches, though it should be observed that this is only by way of example, and that the invention may be implemented also for other types of cutting devices.

The cutting device 1 includes a first jaw member 2 and a second jaw member 3. The first jaw member 2 is attached to a first end of a first handle 5. In the illustrated example this attachment is stiff, in other words, there is no pivot point facilitating mutual rotation between the first jaw member 2 and the first handle 5. The outer second end 6 of the first handle 5, may be provided with a grip which the user may grab with a hand during use of the cutting device 1. The term "handle" refers in this connection to a part intended to be gripped by a user during use of the cutting device.

The second jaw member 3 is rotatably connected to the first jaw member 2 at a first pivot point 7. The first pivot point may be implemented to include a bolt protruding through the first and second jaw members, for instance. Consequently, during cutting strokes, the jaw members 2 and 3 move towards each other by mutual rotation around the first pivot point 7 to cut an object, such as branch, located between the jaw members.

A second handle 8 is rotatably connected to the second jaw member 3 at a second pivot point 9. The term "handle" refers in this connection to a part intended to be gripped by a user during use of the cutting device. Consequently, the second pivot point facilitates mutual rotation between the second handle 8 and the second jaw member 3 in the engaged position. An outer second end 14 of the second handle 8 may be provided with a grip which the user may grab with a hand during use of the cutting device 1.

The cutting device 1 additionally comprises a gear set 10, which includes a first set of teeth 11 at the first jaw member 2, and a second set of teeth 12 at a first end 4 of the second handle 8. In FIGS. 1 to 3 the cutting device is illustrated in the engaged position, where the first set of teeth 11 is engaged with the second set of teeth 12 during a cutting stroke. In the illustrated example, the first set of teeth is illustrated to be a part of the first jaw member, however, in other implementations it is possible to provide the first set of teeth into a separate part which is attached to the first jaw member. In the illustrated example, the second set of teeth is illustrated to be a part of the first the first end of the second handle, however, in other implementations it is possible to provide the second set of teeth into a separate part which is attached to the first end of the second handle.

With the cutting device 1 in the engaged position, as illustrated in FIGS. 1 to 3, movement of the second ends 6 and 14 of the first and second handles 5 and 8 towards each other during a cutting stroke causes different teeth of the gear set 10 to be engaged in turns while the second handle 8 rotates in relation to the second jaw member 3 at the second pivot point 9. Due to this the jaw members 2 and 3 move towards each other. At this stage, the cutting force obtained is dependent on the force that the user directs towards the second ends 6 and 14 of the handles 5 and 8, but also on the gear ratio of the gear set 10.

Depending on the implementation, the gear ratio of the gear 10 may be constant throughout an entire cutting stroke. However, in some implementations, as for garden tools, it may be advantageous to shape the first 11 and second 12 set of teeth in such a way that the gear ratio is variable during the cutting stroke. In such a solution the variable gear ratio is preferably implemented to give a maximum cutting force in the part of the cutting stroke where it is most needed. The precise location of the cutting stroke where the maximum cutting force is needed varies depending on the implementation. In case of a lopper, the maximum cutting force is usually needed when approximately half of a branch has been cut through. However, for a hedge share the maximum cutting force is usually needed in proximity of the end of the cutting stroke.

Figure 5:
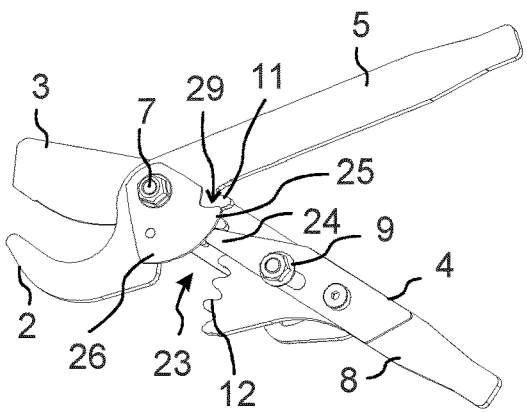
Figure 4:
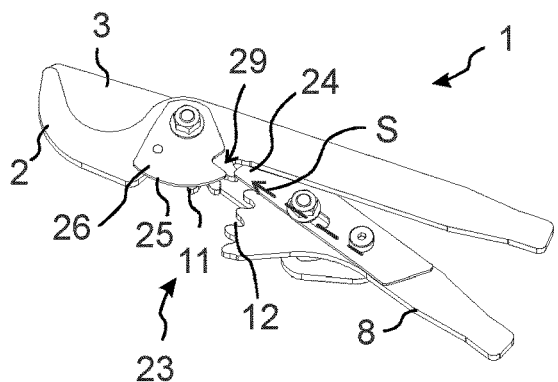

FIGS. 4 and 5 illustrate the cutting device 1 of FIGS. 1 to 3 in a disengaged position. From these figures it can be seen that the first set of teeth 11 and the second set of teeth 12 of the gear set 10 are no longer engaged but located at a distance from each other in the disengaged position.

Transfer from the engaged position to the disengaged position is possible, as the second handle 8 is slidably connected to the second cutting member 3 at the second pivot point 9. In the illustrated example, the second pivot point 9 is implemented by a second protrusion 16, such as a bolt, which is fixedly located to one of the second handle 8 and second jaw member 3 and an elongated opening 17 movably receiving the second protrusion 16 in the other one of the second handle 8 and the second jaw 3. In the figures, by way of example, the straight elongated opening 17 is located in the second handle 8 and the second protrusion 16 is provided at a fixed location at the second jaw member 3, in which case the head of the bolt may be fixedly attached to the second jaw member. Due to this, the second protrusion 16 remains all the time in the same position of the second jaw member 3 while it may move in the elongated opening 17, where contact between the second protrusion 16 and a side wall of the elongated opening 17 prevents sideway movement between the second handle 8 and the second jaw member 3 during cutting strokes in the engaged position. Sliding of the second protrusion 16 within the elongated opening 17 becomes possible while the user transfers the second handle with the second set of teeth from the engaged position to the disengaged position.

The cutting device 1 is additionally provided with a preventer 19. The preventer prevents mutual rotation of the second handle 8 and the second jaw member 3 while the second handle 8 with the second set of teeth 12 are in the disengaged position illustrated in FIGS. 4 and 5. The preventer 19 comprises a third protrusion 20, fixedly located at one of the second handle 8 and the second jaw member 3 and a groove 21 movably receiving the third protrusion 20 in the other one of the second handle 8 and the second jaw member 3.

In the illustrated example, the third protrusion 20 is provided as a bolt fixedly located at the second handle 8, in which case the head of the bolt may be fixedly attached to the second handle 8. The groove 21 is provided to the second jaw member 3 and allows movement of the third protrusion 20 within the groove 21 in the engaged position illustrated in FIGS. 1 to 3. The groove 21 is curved around the second pivot point 9, which facilitates that the third protrusion 20 may move within the groove 21 in the engaged position while mutual rotation of the second handle 8 and the second jaw member 3 occurs during a cutting stroke.

A notch 22 is located in the groove 21 at a larger distance from the second pivot point 9 than other parts of the groove 21 for receiving the third protrusion 20 when the second handle 8 with the second set 12 of teeth slides into the disengaged position. In FIGS. 4 and 5 the second protrusion 20 is in the notch 22. In this way, side walls of the notch 22 and the third protrusion 20 prevent mutual sideway movement (rotation in relation to each other) of the second handle 8 and the second jaw member 3 in the disengaged position. When also sidewalls of the second protrusion 16 and the elongated opening 17 prevent sideway movement (rotation in relation to each other) between the second handle 8 and the second jaw member 3, mutual rotation of the second handle 8 and the second jaw member 3 are prevented in the disengaged position. This makes it possible to utilize the cutting device for cutting without use of the gear set 10.

In praxis it is very easy and quick for a user to move the second handle with the second set of teeth from the engaged position into the disengaged position.

This is possible simply by turning the handles 5 and 8 into a position where the third protrusion 20 is located in the groove 21 in a position between the notch 22 and the second pivot point 9. At that stage the second handle 8 and the second set of teeth 12 can be pulled away from the first set of teeth 11, until the third protrusion 20 is located in the notch 22. After this, the cutting device is ready for use without the gear set 10.

In order to return the second handle 8 with the second set of teeth 12 to the engaged position, special attention needs to be paid to the fact that the first set of teeth 11 and the second set of teeth 12 become engaged at exactly the correct mutual position. If not, the gear set 10 may not work or even be permanently damaged in case the handles 5 and 8 are moved with a large force during incorrect engagement.

In FIGS. 1 to 5, the cutting device 1 has been provided with a slide lock 23 which in an enabling state allows the second handle 8 and the second set of teeth 12 to slide in the slide direction S from the disengaged position to the engaged position only when the first set of teeth 11 and the second set of teeth 12 are aligned into a mutually predetermined position ensuring that the engagement of the first set of teeth 11 and the second set of teeth 12 will be correct.

The mutually predetermined position of the first set of teeth 11 and second set of teeth 12 where the slide lock is enabled may vary in different implementation. However, for a user a very user-friendly solution is to select as the predetermined position the position where the first 5 and second 8 handles are as close to each other as possible, in other words at the end of a cutting strike. In praxis during use of the cutting device, the handles very often reach this particular position, due to which it is easy for the user if this position is selected as the mutually predetermined position.

The slide lock 23 comprises a protrusion 24, moving with the second handle 8 during a cutting stroke, and a contact area 25 on the first handle 5 or on a part moving with the first handle 5 during a cutting stroke. In such a solution the state of the slide lock 23 changes between the enabling state and a disabling state in response to contact or non-contact between the protrusion 24 and the contact area 25.

The slide lock 23 may in practice be implemented in several alternative ways. In the illustrated example of FIGS. 1 to 5, the protrusion 24 protrudes from a first end 4 of the second handle 8 and the curved section 26 is implemented as a part moving with the first handle 5. The curved section 26 has a contact area 25 which is curved around the first pivot point 7 to contact the protrusion 24 and change the state of the slide lock 23. As best seen in FIG. 5, when the first set of teeth 11 and the second set of teeth 12 are disengaged, contact between the protrusion 24 and the contact area 25 change the state of the slide lock 23 into the disabling mode, in other words, the first set of teeth 11 and the second set of teeth 12 cannot be moved towards each other to engage, as long as the first set of teeth 11 and the second set of teeth 12 are not aligned into the mutual predetermined position.

The protrusion 24 and curved section 26 are mutually such shaped, that when the first set of teeth 11 and the second set of teeth 12 are aligned into the mutually predetermined position, as best seen in FIG. 4, the slide lock 23 is in the enabling state allowing the second handle 8 and the second set of teeth to slide in the slide direction S from the disengaged position to the engaged position. In the mutually predetermined position illustrated in FIG. 4, contact does not occur between the protrusion 24 and the contact area 25. In the illustrated example of FIG. 4 this is achieved due to a cutout 29 in the right lower corner of the curved section 26. However, a cutout is not necessary in all implementations as long as the protrusion 24 and contact area 25 are shaped in a way giving sufficient room to avoid contact while sliding into the engaged position occurs in the mutually predetermined position.

FIGS. 6 to 10 illustrate a second embodiment of a cutting device. The embodiment of FIGS. 6 to 10 is very similar to the one previously explained in connection with FIGS. 1 to 5. Therefore, the embodiment of FIGS. 6 to 10 will in the following be explained mainly by pointing out the differences.

A main difference with the second embodiment as compared to the previously explained first embodiment is how the slide lock is implemented. FIGS. 6 to 8 illustrate the cutting device 1' with the slide lock 23' in the enabling state and FIGS. 9 to 10 illustrate the cutting device 1' with the slide lock 23' in the disabling state.

FIGS. 6 and 7 illustrated the cutting device 1' from opposite sides and FIG. 8 illustrates a cross section of the cutting device 1' along line VIII-VIII of FIG. 6. The slide lock 23' comprises a protrusion 24' which moves with the second handle 8 during a cutting stroke. The protrusion 24' is in this example implemented as a part protruding sideways from the second handle 8 towards the first handle 5. A contact area 25' is provided on the first handle 5' on a side which is closest to the second handle 8.

The protrusion 24' is movably arranged on the second handle 8 such that it may rotate around the second pivot point 9. A spring 27' with a spring force is arranged to move (rotate) the protrusion 24' to a position where the slide lock 23' in the disabling state.

In the situation of FIG. 6, the user has pressed the first and second handles 5 and 8 towards each other until the protrusion 24' contacts the contact area 25' on the first handle 5. Due to this the protrusion 24' has rotated around the second pivot point 9 against the spring force of the spring 27'. As a result of the rotation, the third protrusion 20' has moved in relation to the protrusion 24' within a groove 30' of the protrusion 24' such that the protrusion 24' is located in a (upper) part of this groove which is larger than other (lower) parts of this groove, where the third protrusion was located before the protrusion 24' contacted the contact area 25'. Therefore, the slide lock is now in the enabling state.

From FIG. 8, illustrating the enabling state of the slide lock 23', it can be seen, that the third protrusion 20' has a middle section 31' which in cross-section is larger than the surrounding sections of the third protrusion 20'. However, due to the fact that the third protrusion 20' in the enabling state is located in the (upper) part of the groove 30' which is larger, it is possible for a user to press a pushbutton 28' to the left against a spring force of a spring 32' such that the third protrusion 20' moves left in FIG. 8 and the middle section 31' enters the groove 30'. Due to this a narrower section (right end) of the third protrusion 20' enters the notch 22 in the second jaw member 3, which has the consequence, that the user can slide the second handle 8 and the second set of teeth 12 in the slide direction to the engaged position, which is illustrated in FIGS. 6 and 7.

FIGS. 9 and 10 (which is a cross-section of FIG. 9 along line X-X) correspond to FIGS. 6 and 8 with the exception that in these figures the slide lock 23' is still in the disabling state. Consequently, the user has not pressed the first 5 and second 8 handles sufficiently against each other to cause the protrusion 24' to sufficiently contact the contact area 25' to rotate the protrusion 24' against the spring force of the spring 27'. Due to this the third protrusion 20' is still located in the (lower) narrower part of the groove 30' in the protrusion 24', and it is not possible for a user to press the pushbutton 28' to the left against a spring force of the spring 32' such that the third protrusion 20' moves left in FIG. 10 and the middle section 31' enters the groove 30'. Instead contact between the middle section 31' and the walls in the narrower part of the groove 30' occur (as seen in FIG. 10) and the slide lock 23' remains in the disabling state.

It is to be understood that the above description and the accompanying figures are only intended to illustrate the present invention. It will be obvious to a person skilled in the art that the invention can be varied and modified without departing from the scope of the invention.

What is claimed is:

1. A cutting device, comprising:
    a first jaw member and a second jaw member pivotally connected to each other by a first pivot point to mutually rotate in relation to each other around the first pivot point during a cutting stroke which moves the first and second jaw members towards each other,
    a first handle attached to the first jaw member,
    a second handle rotatably connected to the second jaw member by a second pivot point, and
    a first set of teeth in the first jaw member and a second set of teeth in a first end of the second handle, the first set of teeth and the second set of teeth mating with each other in an engaged position to form a gear set and to move the first and second jaw members mutually towards each other during the cutting stroke,
    wherein said second pivot point connects the second handle rotatably and slidably to the second jaw member to allow the second handle and the second set of teeth to move into a disengaged position where the second set of teeth are located at a distance from the first set of teeth where the first and second set of teeth are no longer mating,
    a third protrusion is fixedly located on the second handle and a groove movably receiving the third protrusion is provided in the second jaw member, wherein the third protrusion and the groove cooperate to form a preventer that prevents rotation of the second handle in relation to the second jaw member while the second handle with the second set of teeth are in the disengaged position, and the cutting device further comprises:

a first protrusion moving with the second handle during the cutting stroke and a contact area on the first handle that are selectively engageable to form a slide lock where an enabling state occurs in response to non-contact between the first protrusion and the contact area and a disabling state occurs in response to contact between the first protrusion and the contact area, and wherein the enabling state allows the second handle and the second set of teeth to slide from the disengaged position to the engaged position only when a user has aligned the first set of teeth and the second set of teeth into a mutually predetermined position, at which position said sliding may occur without contact between the protrusion and the contact area.

2. The cutting device according to claim 1, wherein the first protrusion moves with the second handle during the cutting stroke and protrudes in a slide direction from a first end of the second handle, and the contact area on the first handle is curved around the first pivot point to contact the protrusion and change a state of the slide lock to the disabling state, when the first set of teeth and the second set of teeth are not aligned into the mutually predetermined position.

3. The cutting device according to claim 1, wherein the first set of teeth and the second set of teeth are aligned into said mutually predetermined position at the end of the cutting stroke when the first and second handles are as close to each other as possible.

4. The cutting device according to claim 1, wherein the second handle and the second jaw member are connected to each other by the second pivot point by a second protrusion at a fixed location in the second jaw member and an elongated opening movably receiving the second protrusion in the second handle.

5. The cutting device according to claim 1, wherein the groove in the second jaw member which is curved around the second pivot point said groove is provided with a notch located at a larger distance from the second pivot point than other parts of the groove for receiving the third protrusion which is fixedly located to the second handle when the second handle with the second set of teeth is in the disengaged position.

6. The cutting device according to claim 1, wherein the cutting device is a lopper.

7. The cutting device according to claim 1, wherein the cutting device is a hedge shear.

* * * * *